(12) United States Patent
Lim et al.

(10) Patent No.: US 12,392,989 B2
(45) Date of Patent: Aug. 19, 2025

(54) OPTICAL PATH CHANGING UNIT AND LENS ASSEMBLY COMPRISING SAME

(71) Applicants: MICRO ACTUATOR CO., LTD., Yongin-si (KR); Dae Soon Lim, Yongin-si (KR)

(72) Inventors: Dae Soon Lim, Yongin-si (KR); Hak Ku Yoon, Suwon-si (KR); Myung Won Choi, Yongin-si (KR); Dong Sung Lee, Pyeongtaek-si (KR)

(73) Assignee: MICRO ACTUATOR CO., LTD., Yongin-si (KR)

( * ) Notice: Subject to any disclaimer, the term of this patent is extended or adjusted under 35 U.S.C. 154(b) by 611 days.

(21) Appl. No.: 17/790,354

(22) PCT Filed: Sep. 18, 2020

(86) PCT No.: PCT/KR2020/012591
§ 371 (c)(1),
(2) Date: Jun. 30, 2022

(87) PCT Pub. No.: WO2021/182697
PCT Pub. Date: Sep. 16, 2021

(65) Prior Publication Data
US 2023/0040027 A1    Feb. 9, 2023

(30) Foreign Application Priority Data

Mar. 11, 2020  (KR) .................. 10-2020-0030330
Jun. 1, 2020   (KR) .................. 10-2020-0066057

(51) Int. Cl.
*G02B 7/18*     (2021.01)
*G02B 13/00*    (2006.01)
(Continued)

(52) U.S. Cl.
CPC ....... *G02B 7/1805* (2013.01); *G02B 13/0065* (2013.01); *G02B 27/646* (2013.01);
(Continued)

(58) Field of Classification Search
CPC ...... G02B 7/18; G02B 7/1805; G02B 7/1821; G02B 27/646
See application file for complete search history.

(56) References Cited

U.S. PATENT DOCUMENTS 4,460,252 A * 7/1984 Volleau ............... G02B 7/1821
9,395,551 B2   7/2016 Ando et al.
(Continued)

FOREIGN PATENT DOCUMENTS

CN    106483623 A * 3/2017  .......... G02B 7/1805
JP    2015-079086 A   4/2015
(Continued)

OTHER PUBLICATIONS

Machine translation of CN 106483623 retrieved electronically from Espacenet Mar. 7, 2025 (Year: 2025).*
(Continued)

*Primary Examiner* — Cara E Rakowski
(74) *Attorney, Agent, or Firm* — Frost Brown Todd LLP

(57) ABSTRACT

Disclosed are an optical path changing unit and a lens assembly comprising same. The optical path changing unit comprises: a base; a prism unit a part of which is connected to the base and the other part of which is arranged to be movable within the base; and first to third optical image stabilizing (OIS) drive units which change the prism unit into a tiltable position.

6 Claims, 11 Drawing Sheets

(51) Int. Cl.
    *G02B 27/64*     (2006.01)
    *H02K 3/26*     (2006.01)
    *H02K 41/035*     (2006.01)

(52) U.S. Cl.
    CPC ........... *H02K 3/26* (2013.01); *H02K 41/0354* (2013.01); *H02K 2203/03* (2013.01)

(56) References Cited

U.S. PATENT DOCUMENTS

| | | | |
|---|---|---|---|
| 10,334,146 | B2 | 6/2019 | Im et al. |
| 10,564,442 | B2 | 2/2020 | Seol et al. |
| 2006/0268431 | A1* | 11/2006 | Jin ................... G02B 27/646 359/726 |
| 2008/0080037 | A1 | 4/2008 | Oh et al. |
| 2020/0333622 | A1 | 10/2020 | Fujisaki et al. |
| 2022/0263981 | A1* | 8/2022 | Park ................... H04N 23/51 |
| 2022/0368818 | A1* | 11/2022 | Kim ................... G02B 7/1805 |

FOREIGN PATENT DOCUMENTS

| | | | |
|---|---|---|---|
| JP | 6613005 B1 | | 11/2019 |
| KR | 10-2004-0101097 A | | 12/2004 |
| KR | 10-0509956 B1 | | 8/2005 |
| KR | 10-20180097228 | * | 8/2018 |
| KR | 10-2018-0120894 A | | 11/2018 |
| KR | 10-2018-0137277 A | | 12/2018 |
| KR | 10-2004802 B1 | | 7/2019 |

OTHER PUBLICATIONS

Machine translation of KR-10-2018-0097228-A retrieved electronically from Espacenet Mar. 7, 2025 (Year: 2025).*
Int'l. Search Report for PCT/KR2020/012591, Jan. 15, 2021, Korean Intellectual Property Office, Daejeon, Korea.
Written Opinion of the Int'l. Searching Authority for PCT/KR2020/012591, Jan. 15, 2021, Korean Intellectual Property Office, Daejeon, Korea.
KIPO; Office Action, dated Feb. 3, 2025; KR Pat. App. No. 10-2020-0066057; 15 pages, including English translation.

* cited by examiner

500

OPTICAL PATH CHANGING UNIT AND LENS ASSEMBLY COMPRISING SAME

TECHNICAL FIELD

This disclosure relates to a miniature lens assembly applied to a mobile device, and more particularly, to an optical path changing unit for changing an optical path using a prism, and a miniature lens assembly having the same.

BACKGROUND ART

In general, a camera module (or a lens assembly) is installed in a small mobile device (e.g., a smart phone, etc.) for capturing. The camera module tends to be manufactured in a very small size in consideration of the size and weight of the mobile device.

The ultra-small camera module applied to smartphones these days has an optical zoom function. Optical zoom, which may take close-up pictures of a distantly-located subject, is realized by moving a lens for a predetermined distance inside the camera module. In this case, as the distance between the image sensor and the lens gets farther, high magnification optical zoom may be realized. Therefore, the optical 5× zoom should secure a focal length that is 2.5 times longer than the optical 2× zoom.

For this reason, in order to realize high magnification optical zoom, there may be problem in that the height of the camera module may increase, and the camera placed on the back of the smartphone may protrude.

In order to solve this problem, a method of applying a prism to the camera module has been adopted. When a prism is applied to the camera module, the camera module may be disposed along the length or width direction of the main body of the smartphone, so it is possible to prevent the camera module from protruding excessively from the rear surface of the smartphone.

However, the camera module adopting the prism as described above has a structure for tilting the prism for optical image stabilizing (OIS). However, since the structure for tilting the prism is made very complicated, the assembling property is remarkably low, and it is a factor that increases the manufacturing cost, and there is a problem that maintenance is also not easy due to the complicated structure. In addition, there may be a problem in that the camera module is easily damaged when a shock is added to the camera module.

DISCLOSURE

Technical Problem

It is an object of the disclosure to address the above-mentioned problems, and provide an optical path changing unit having a simple prism tilting structure and a lens assembly having the same.

Another object of the disclosure is to provide an optical path changing unit capable of absorbing an external shock to prevent damage, and a lens assembly having the same.

Technical Solution

Provided is an optical path changing unit including a base; a prism unit in which a portion is connected to the base and other portion is movably disposed in the base; and a first to third optical image stabilizing (OIS) driving unit to change the prism unit to a tiltable posture.

The prism unit may include a holder; a prism coupled to the holder; and a hinge member for tiltably supporting the holder based on two axes orthogonal to each other.

The hinge member may include a fixing portion fixed to a rear of the holder; a connection portion disposed at a distance from the fixing portion; a coupling portion fixed to the rear of the base and disposed at a distance from the connection portion; a first hinge portion interconnecting the connection portion and the fixing portion; and a second hinge portion disposed to be orthogonal to the first hinge portion and interconnecting the fixing portion and the coupling portion.

The fixing portion, the first hinge portion, the connection portion, the second hinge portion, and the coupling portion may be integrally injection-molded to form the hinge member.

A material of the hinge member may be a synthetic resin having elasticity.

The first OIS driving unit may tilt the prism about the first hinge axis, and the second and third OIS driving units may tilt the prism about the second hinge axis.

The first OIS driving unit may include a first coil disposed on the lower surface of the base, and a first magnet coupled to the lower surface of the holder to respond to the direction of current applied to the first coil, the second OIS driving unit may include a second coil disposed on a left side of the base, and a second magnet coupled to the left surface of the holder to respond to the direction of the current applied to the second coil, and the third OIS driving unit may include a third coil disposed on the right side of the base, and a third magnet coupled to the right side of the holder to respond to the direction of the current applied to the third coil.

The prism unit may rotate about ±3° about the first hinge axis and may rotate about ±3° about the second hinge axis.

The optical path changing unit may further include a flexible printed circuit board (FPCB) to which the first to third coils are electrically connected, the FPCB may be coupled to the base while covering the lower, left and right sides of the base, and a plurality of terminals may be arranged in a line at one end at intervals.

Provided is a lens assembly including an optical path changing unit comprising a base, a prism unit in which a portion is connected to the base and other portion is movably disposed in the base; and a first to third optical image stabilizing (OIS) driving unit to change the prism unit to a tiltable posture; a case in which the optical path changing unit is disposed at one side in the case; an image sensor disposed at other side of the case; and a lens unit disposed on an optical path between the optical path changing unit and the image sensor.

BEST MODE FOR CARRYING OUT THE INVENTION

Figure 1:
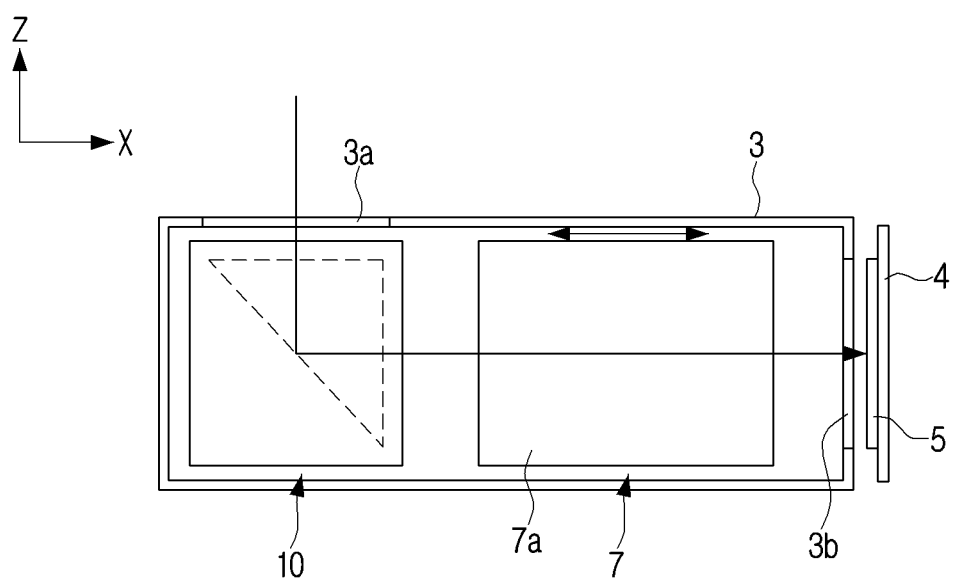
FIG. 1 is a view illustrating a structure of a network system according to an embodiment.

Hereinafter, various embodiments will be described in detail with reference to the accompanying drawings. The embodiments described herein may be variously modified. Certain embodiments may be described in the drawings and described in detail in the detailed description. However, the specific embodiments disclosed in the accompanying drawings are to facilitate understanding various embodiments. Accordingly, it is to be understood that the present invention is not limited to the specific embodiments disclosed in the accompanying drawings, and it is to be understood that all equivalents or alternatives included within the spirit and scope of the invention are included.

In this disclosure, the terms first, second, etc. may be used to describe various components, but these components are not limited by the terms discussed above. The terms described above are used only to distinguish one component from another component.

It is to be understood that the terms such as "comprise" may, for example, be used to designate a presence of a characteristic, number, step, operation, element, component, or a combination thereof, and not to preclude a presence or a possibility of adding one or more of other characteristics, numbers, steps, operations, elements, components or a combination thereof.

In the disclosure, the size of the miniature lens assembly is smaller than the size of a lens assembly provided in an ordinary digital single lens reflex (DSLR) camera or a mirror-less camera, and may be approximately similar to the size of a lens assembly applied to a smartphone these days.

When it is decided that a detailed description for the known art related to the disclosure may unnecessarily obscure the gist of the disclosure, the detailed description may be shortened or omitted.

Hereinafter, a lens assembly according to an embodiment of the disclosure will be described with reference to the drawings.

FIG. 1 is a schematic view illustrating a structure of a network system according to an embodiment.

Referring to FIG. 1, a lens assembly 1 according to an embodiment of the disclosure may be installed in a mobile device (not shown) such as a relatively small mobile phone and used to capture a subject. The lens assembly 1 may implement functions such as Auto Focusing (AF), Zoom, and Optical Image Stabilizing (OIS).

The lens assembly 1 may include a case 3 installed in the mobile device, an image sensor (CCD sensor) 5 disposed on one side of the case, an optical path changing unit 10 which changes an optical path of external light of the mobile device to the image sensor 5 and performs OIS function, and a lens unit 7 movably disposed between the optical path changing unit 10 and the image sensor 5 to perform auto focusing (AF) and Zoom function.

The image sensor 5 may be disposed outside the case 3 while being mounted on the substrate 4. In this case, the substrate 4 may be properly fixed to the structure in the mobile device.

In the disclosure, it is illustrated that the image sensor 5 and the substrate 4 are disposed outside the case 3, but the embodiment is not limited thereto. The image sensor 5 and the substrate 4 may be disposed inside the case 3.

The lens unit 7 may be arranged to move forward or backward by a predetermined distance along the optical axis direction in the case 3 by an AF driving unit (not shown). Here, the optical axis direction refers to an X-axis direction in which the optical path is changed by the optical path changing unit 10 and is directed toward the lens unit 7.

The lens unit 7 may include a lens barrel 7a and a plurality of lenses (not shown) disposed in the lens barrel 7a along the optical axis direction. In this case, the plurality of lenses may be formed of a plurality of lens groups. For example, the first lens group may be disposed on the first lens barrel, the second lens group may be disposed on the second lens barrel, and the third lens group may be disposed on the third barrel. The first to third lens barrels may be sequentially disposed in the optical axis direction, the first and third lens barrels may be disposed to be movable along the optical axis, and the second lens barrel may be disposed to be fixed.

The AF driving unit may include a magnet and a corresponding coil. The magnet may be disposed on one side of the lens unit 7, and the coil may be disposed to correspond to the magnet at a predetermined distance from the magnet inside the case.

The optical path changing unit 10 may be disposed on one side of the lens unit 7, and by changing the path of light incident through the first opening 3a of the case 3 from the outside of the case 3, the light is reflected toward the lens unit 7. After passing through the lens unit 7, the light may be incident on the image sensor 5 through the second opening 3b of the case 3.

The optical path changing unit 10 may compensate shake by tilting a prism 530 to a relative displacement responding to the hand shake so as to prevent the degradation of image quality due to blurring of an image or shaking of a moving image by hand shake of a user when capturing the subject. In this case, the prism 530 is rotated by a predetermined angle about two axes orthogonal to each other.

A structure of the optical path changing unit 10 will be described in detail with reference to FIGS. 2 to 4.

Figure 2:
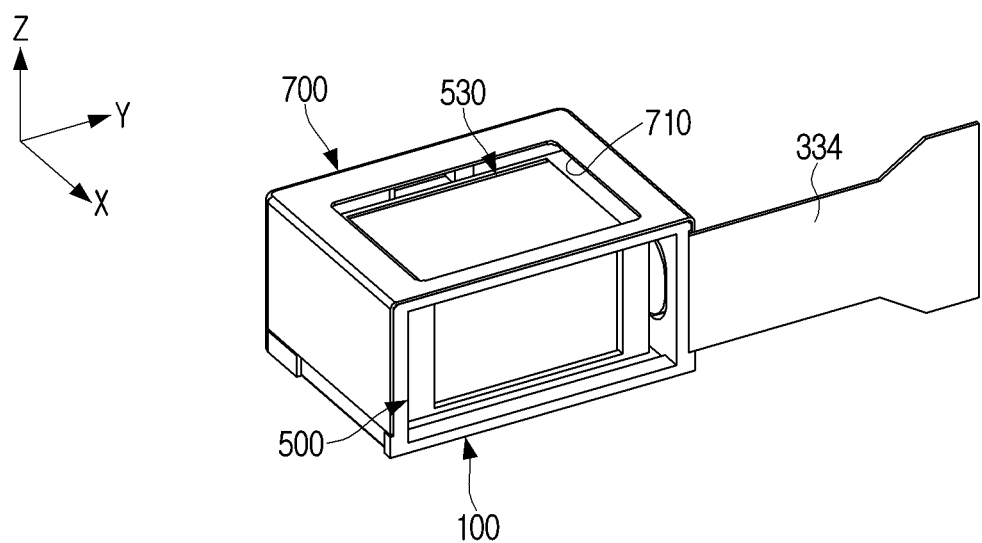
FIG. 2 is an assembly perspective view illustrating an optical path changing unit of a lens assembly unit according to an embodiment.

FIG. 2 is an assembly perspective view illustrating an optical path changing unit of a lens assembly unit according to an embodiment; FIGS. 3 and 4 are exploded perspective views illustrating an optical path changing unit of a lens assembly according to an embodiment of the disclosure.

Figure 3:
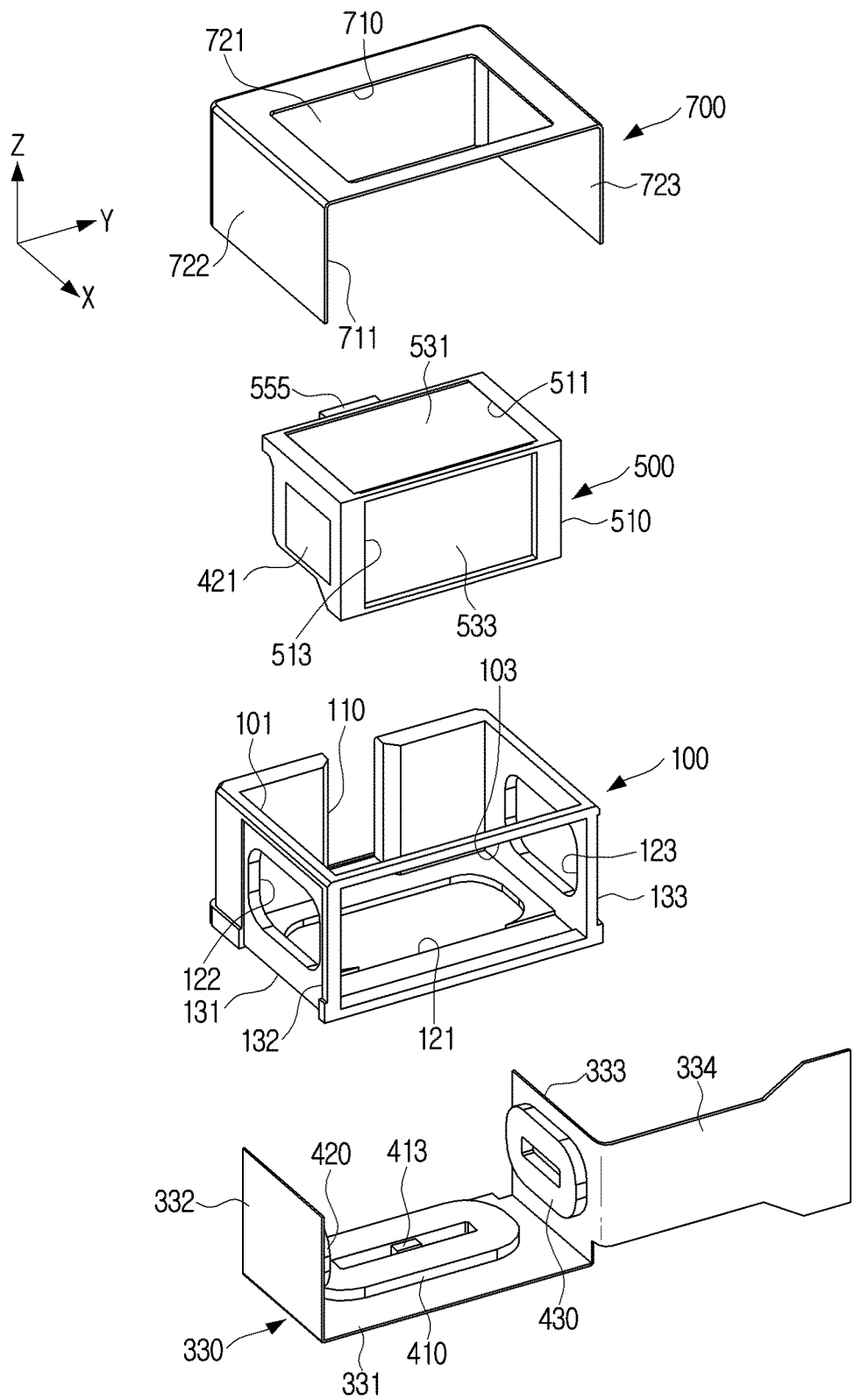
FIGS. 3 and 4 are exploded perspective views illustrating an optical path changing unit of a lens assembly according to an embodiment of the disclosure.
Figure 4:
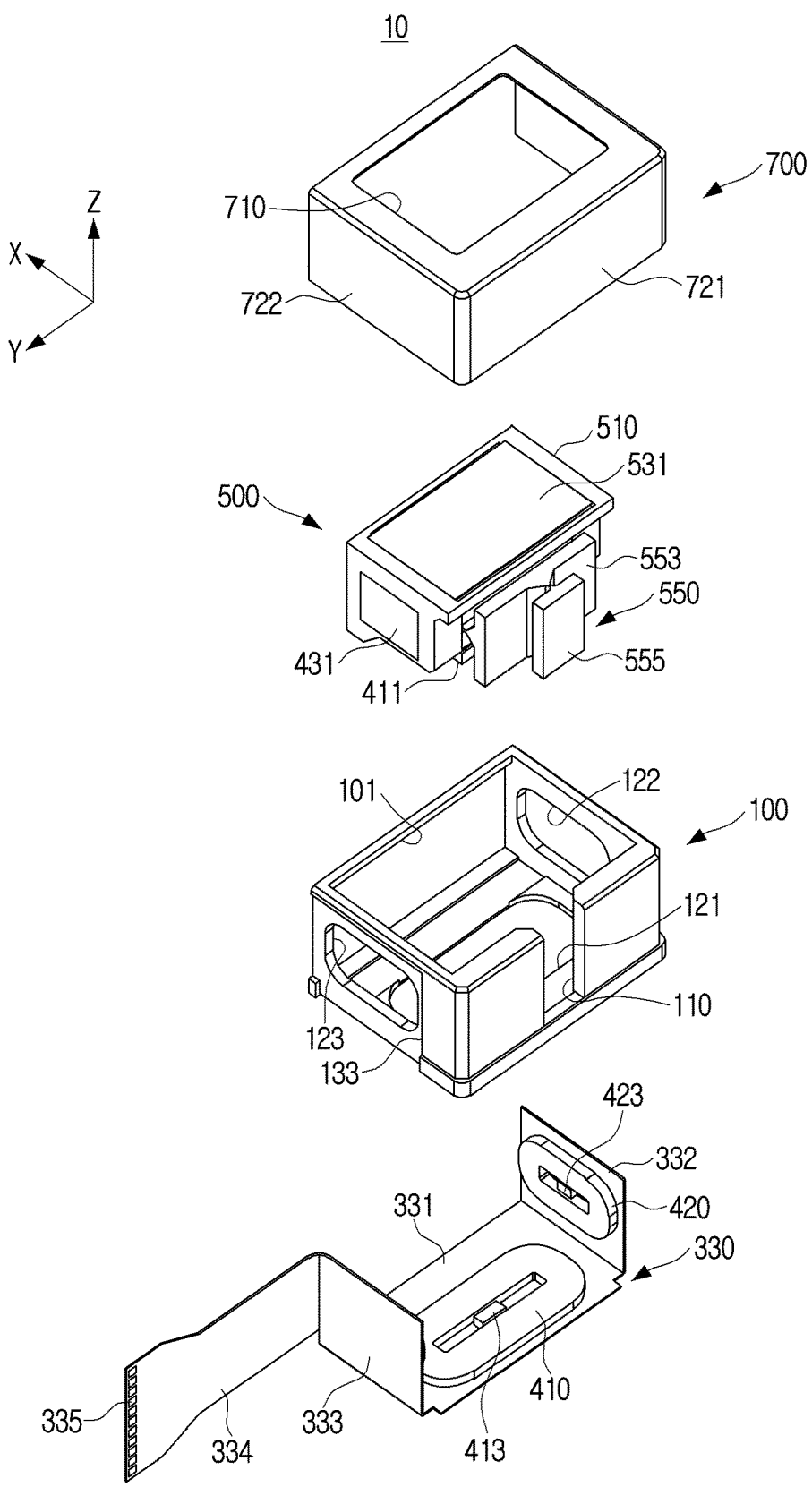

Referring to FIGS. 2 to 4, the optical path changing unit 10 includes a base 100, a prism unit 500 of which a portion is detachably coupled to the base 100, and first to third OIS driving units for rotating about a first hinge 552 (refer to FIG. 7) parallel to an Y-axis and a second hinge 554 (refer to FIG. 8) parallel to a Z-axis to incline in a predetermined posture, and a cover 700 for preventing the prism unit 500 from being separated from the base 100.

The base 100 may be fixedly installed in the case 3. The base 100 has a substantially rectangular parallelepiped shape, and a first light passage hole 101 for light incident is formed on the upper surface, and a second light passage hole 103 for outputting light is provided on the front side, respectively.

The first light passage hole 101 serves as a hole for light incidence but also for inserting the prism unit 500 into the base 100 as well as for taking out light from the inside of the base 100.

The base 100 is formed with a first insertion hole 121 into which a first coil 410, which is a part of the first OIS driving unit, is inserted, on the lower surface of the base 100, and second and third insertion holes 122 and 123 into which each of the second and third coils 420, 430, which are a part of the second and third OIS driving units, are formed on the left surface and the right surface. The first to third insertion holes 121, 122, and 123 may have shapes corresponding to the shapes of the first to third coils 410, 420 and 430, respectively.

A coupling groove 110 to which a coupling portion 555 of a hinge member 550 constituting a part of the prism unit 500 is detachably coupled is formed at a rear surface of the base 100.

At an outer part of the bottom, left, and the right sides is formed with first to third seating grooves 131, 132, 133 in which the printed circuit board 330 for applying power to the first to third OIS driving units is disposed.

The printed circuit board 330 may be a flexible printed circuit board (FPCB) having flexibility. The first coil 410 may be disposed on the first portion 331 of the printed circuit board 330, the second coil 420 may be disposed on the second portion 332, and the third coil 430 may be disposed on the third portion 333 of the printed circuit board 330, respectively.

The printed circuit board 330 may mount the first and second magnetic sensors 413 and 423 for sensing the moving distance of the magnet forming the first to third OIS driving units. In this case, the magnetic sensor may be a hall sensor or a magneto resistive (MR) sensor.

Referring to FIG. 3, the first magnetic sensor 413 may be mounted on the first portion 331 of the printed circuit board, and may be disposed in an inner empty space of the first coil 410. The second magnetic sensor 423 may be mounted on the second portion 332 of the printed circuit board, and may be disposed in an inner empty space of the second coil 420.

The printed circuit board 330 may be coupled with first to third seating grooves 131, 132, 133 in a form of surrounding a lower side, a left side, and a right side of the base 100.

The printed circuit board 330 includes a fourth portion 334 that is withdrawn from the third portion 333 by a predetermined length. The fourth portion 334 may be formed with a plurality of connection terminals 335 along an end portion at intervals, as shown in FIG. 4.

The plurality of connection terminals 335 are electrically connected to the first through third coils 410, 420, and 430 and the first and second magnetic sensors 413 and 423 through a plurality of wires. The plurality of connection terminals 335 may be electrically connected to an electronic device (e.g., a control circuit, a power supply circuit, etc.) provided in the mobile device.

The first OIS driving unit includes the first coil 410 and a first magnet 411 arranged to correspond to the first coil 410 at regular intervals. The first coil 410 may be disposed on the first insertion hole 121 of the base 100, and the first magnet 411 may be disposed on the lower surface of the holder 510. The attractive or repulsive force is generated by an electromagnetic field formed between the first magnet 411 and the first coil 410 according to the direction of the current applied to the first coil 410. Accordingly, the holder 510 to which the first magnet 411 is coupled may rotate at a predetermined angle with respect to the first hinge portion 552. The first hinge portion 552 may adjust the degree of bending (e.g., flexibility) by changing the thickness or material.

The second OIS driving unit includes a second coil 420 and a second magnet 421 arranged to correspond to the second coil 420 at regular intervals. The second coil 420 is disposed on the second insertion hole 122 of the base 100, and the second magnet 421 may be disposed on the left side of the holder 510. An attractive or repulsive force is generated by an electromagnetic field formed between the second magnet 421 and the second coil 420 according to the direction of the current applied to the second coil 420. Accordingly, the holder 510 to which the second magnet 421 is coupled may rotate at a predetermined angle with respect to the second hinge portion 554. The second hinge portion 554 may also adjust the degree of bending by changing the thickness or material, similar to the first hinge portion 552.

The third OIS driving unit rotates the holder 510 at a predetermined angle with respect to the second hinge portion 554 together with the second OIS driving unit. The third OIS driving unit includes a third coil 430 and a third magnet 431 arranged to correspond to the third coil 430 at regular intervals. The third coil 430 may be disposed on the third insertion hole 123 of the base 100, and the third magnet 431 may be disposed on the right side of the holder 510. The attractive or repulsive force is generated by an electromagnetic field formed between the third magnet 431 and the third coil 430 according to the direction of the current applied to the third coil 430.

The third coil 430 may be formed to be greater than the first and second coils 410, 420. However, the embodiment is not limited thereto and the third coil 430 may be of the same size as the first and second coils 410 and 420, or may be composed of two coils. When formed of two coils, the third coil 430 may be formed to be the same size as the first coil 410 or the second coil 420.

The prism unit 500 may be inserted into the base 100, and a coupling portion 555 of the hinge member 550 is inserted into the coupling groove 110 of the base 100. The prism unit 500 is disposed such that a portion except the coupling portion 555 of the hinge member 550 is movable inside the base 100.

When the prism unit 500 rotates with respect to the first hinge portion 552 and the second hinge portion 554, the prism unit 500 may change the optical path while moving without being interfered in the inside of the base 100. The structure of the prism unit 500 will be described in detail below.

A cover 700 has a first opening 710 so that an input plane 531 of a prism 530 is exposed on an upper surface and a second opening 711 is formed on a front surface so that an output plane 533 of the prism 530 is exposed on a front surface.

The cover 700 may include a plurality of side walls 721, 722, 723 covering the rear, left, and right sides of the base 100. The second and third portions of the printed circuit board 330 coupled to the base 100 may be protected by a plurality of side walls 722, 723.

A structure of a prism unit will be described in detail with reference to FIGS. 5 to 8.

Figure 5:
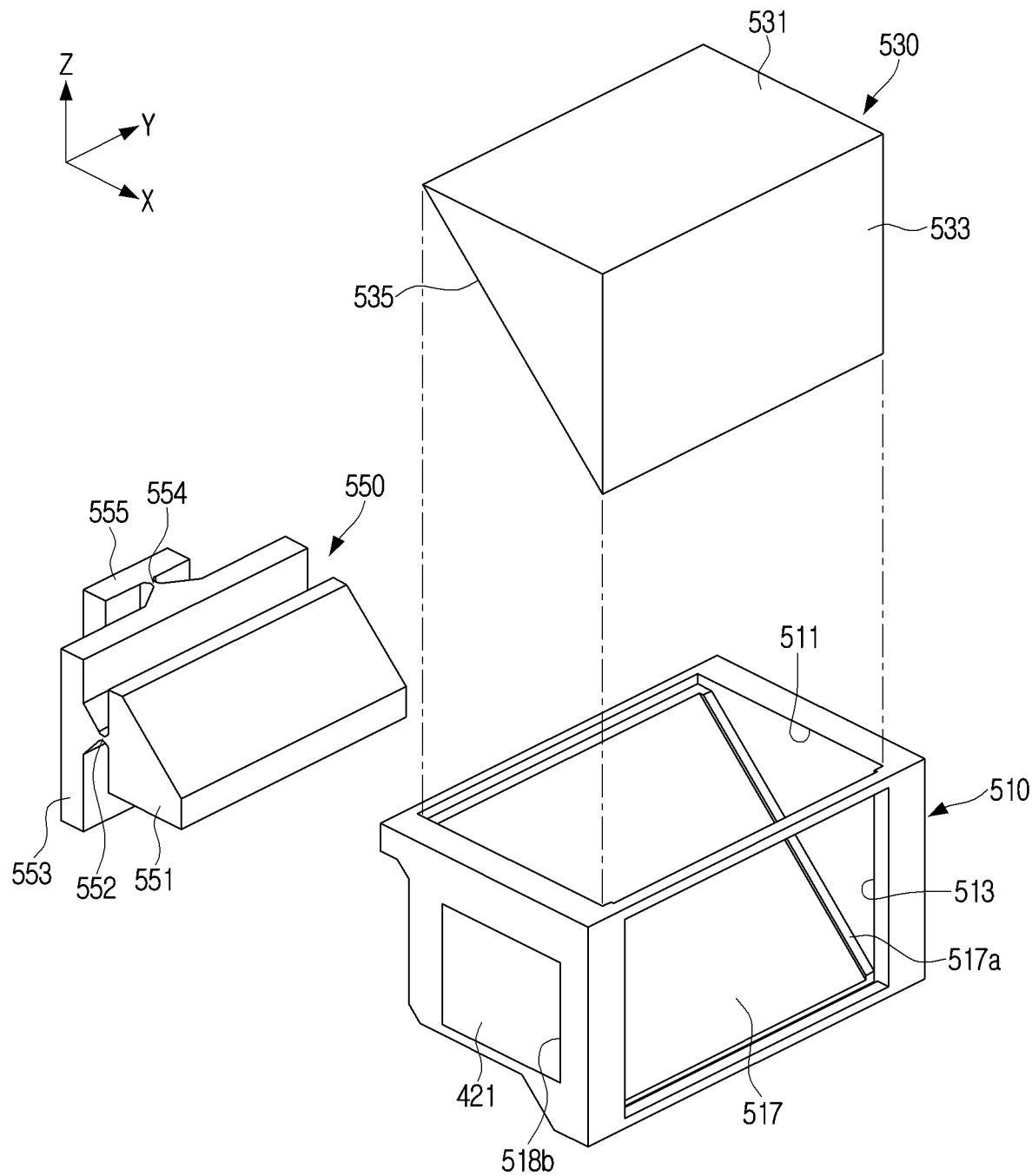
FIGS. 5 and 6 are exploded perspective views illustrating a prism unit provided in the optical path changing unit.
Figure 6:
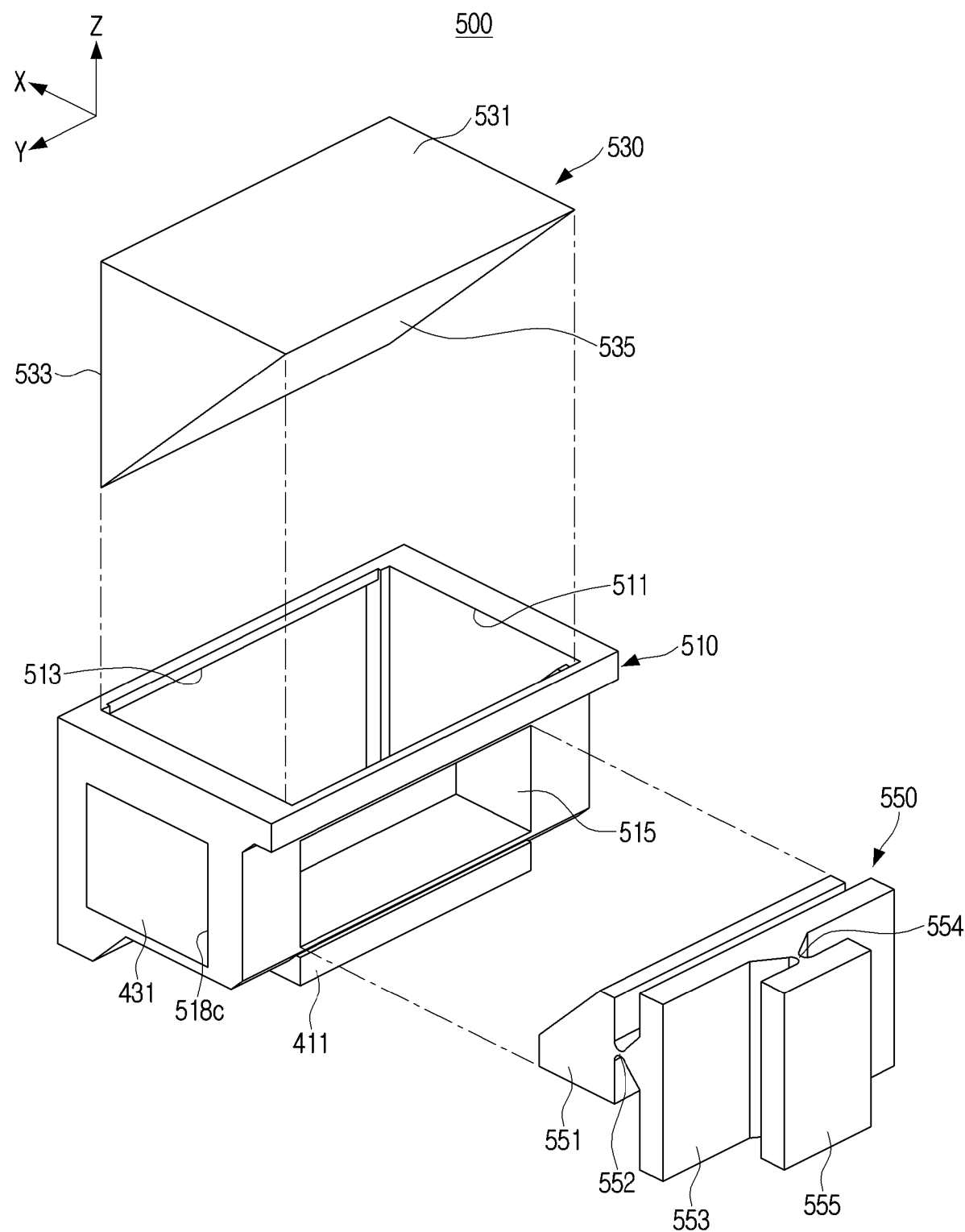
Figure 7:
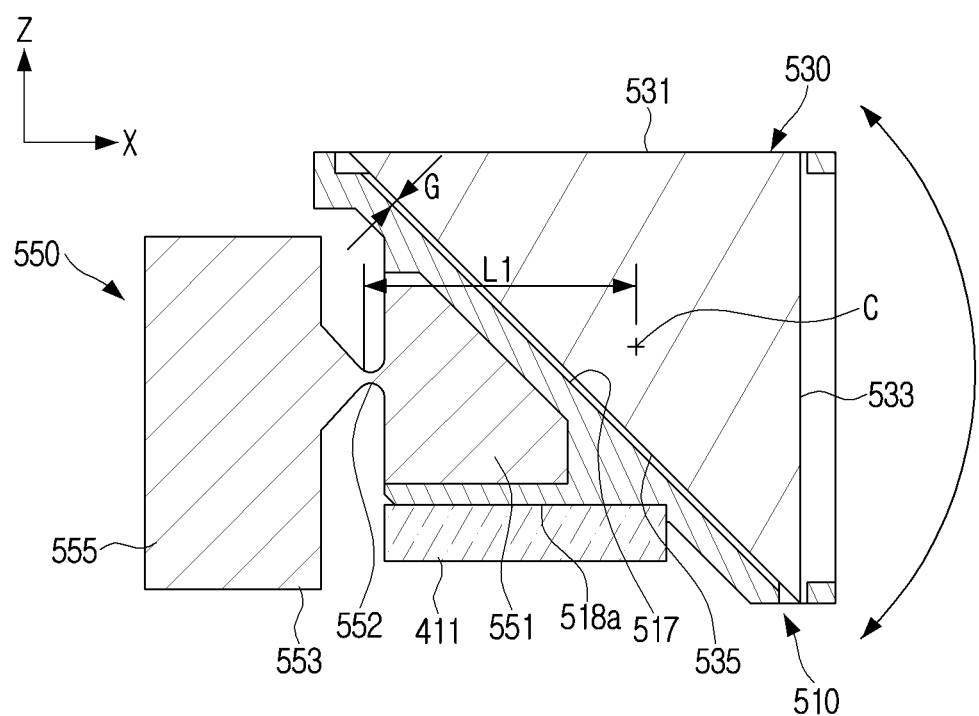
FIG. 7 is a side cross-sectional view of the optical path changing unit.
Figure 8:
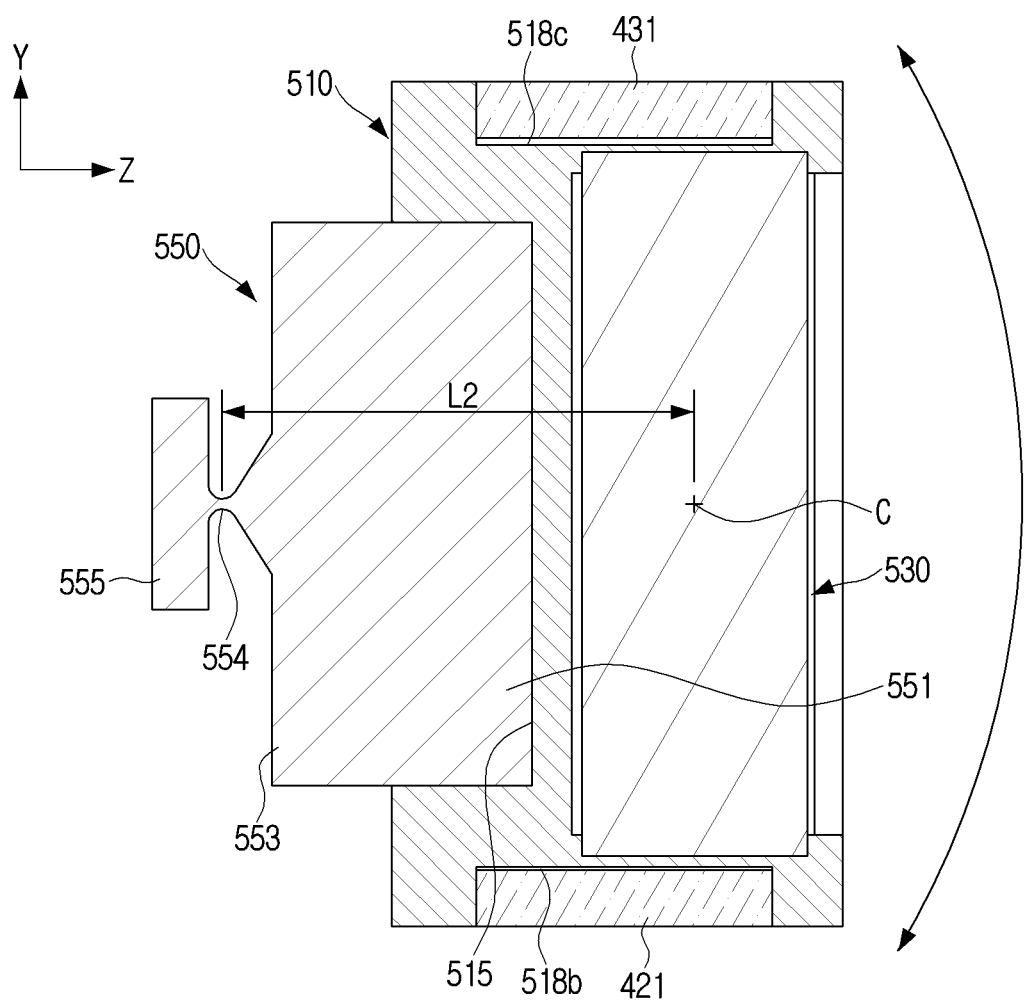
FIG. 8 is a plan sectional view of the optical path changing unit.

FIGS. 5 and 6 are exploded perspective views illustrating a prism unit provided in the optical path changing unit; FIG. 7 is a side cross-sectional view of the optical path changing unit; FIG. 8 is a plan sectional view of the optical path changing unit.

Referring to FIGS. 5 and 6, the prism unit 500 may include a holder 510, a prism 530 inserted into the holder 510, and a hinge member 550 rotating the prism 530 at a predetermined angle about the first and second hinge portions 552 and 554 disposed parallel to the Y-axis and the Z-axis together with the holder 530.

The holder 510 may have a third opening 511 so that the input plane 531 of the prism 530 is exposed on an upper surface and a fourth opening 513 so that the output plane 533 of the prism 530 is exposed on a front surface.

The holder 510 may be formed with an inclined surface 517 corresponding to the reflection surface 535 of the prism

530. A seating protrusion 517a may be formed along the left and right ends of the inclined surface 517, respectively. As the reflection surface 535 of the prism 530 is seated on the seating protrusion 517a, the inclined surface 517 of the holder and the reflection surface 535 of the prism maintain a predetermined gap G (see FIG. 7). The inclined surface 517 of the holder may be formed of a material that does not absorb light and at the same time does not reflect light.

The holder 510 has a first magnet coupling groove 518a to which the first magnet 411 is coupled at a lower surface thereof, and second and third magnet coupling grooves 518b and 518c to which the second and third magnets 421 and 431 are coupled are formed on the left and right sides, respectively.

The holder 510 is changed into various postures by the first to third OIS driving units, and is reflected by the reflection surface 535 of the prism to change the optical path toward the lens unit 7. The holder 510 may be indirectly connected to the base 100 through the hinge member 550.

The hinge member 550 includes a fixing portion 551 fixedly coupled to the fixing groove 515 formed on the rear surface of the holder 510. The fixing portion 551 may be bonded to the fixing groove 515 through an adhesive (not shown) so as not to be separated from the fixing groove 515 of the holder.

The hinge member 550 includes a connection portion 553 disposed at a rear portion of the fixing portion 551 at intervals, and a coupling portion 555 disposed at a rear portion of the connection portion 553 at intervals. In this case, the fixing portion 551 and the connection portion 553 are interconnected by the first hinge portion 552, and the connection portion 553 and the coupling portion 555 are interconnected by the second hinge portion 554.

The first hinge portion 552 may be formed to be in parallel with a Y axis, and the second hinge portion 554 may be formed to be in parallel with a Z axis.

Referring to FIGS. 7 and 8, the prism 530 may be rotated at a predetermined angle with respect to the Y-axis direction by the first hinge portion 552 together with the holder 510. The prism 530 may be rotated at a predetermined angle with respect to the Z-axis direction by the second hinge portion 554 along with the holder 510.

As the second hinge portion 554 is positioned behind the first hinge portion 552, the first distance L1 from the center of the first hinge portion 552 to the center C of the prism 530 is shorter than the second distance L2 between the center of the second hinge portion 554 and the center C of the prism 530.

The first and second hinge portions 552 and 554 may be formed to be bendable and have a thickness gradually decreasing toward the center of the first and second hinge portions 552 and 554. The hinge member 550 is preferably made of a material having an elastic force to prevent the first and second hinge portions 552 and 554 from being disconnected. For example, the hinge member 550 may be made of a synthetic resin having appropriate rigidity and elastic force.

In the hinge member 550, the fixing portion 551, the first hinge portion 552, the connection portion 553, the second hinge portion 554, and the coupling portion 555 may be integrally injection-molded. Accordingly, the hinge member 550 may be easily manufactured and handled, and may be easily assembled between the base 100 and the holder 510 as the hinge member 550 is formed of a single member.

Since the hinge member 550 is made of a material having an elastic force, it is possible to absorb shock even if shock is applied to the lens assembly 1, thereby preventing damage.

As described above, in the disclosure, when the hand shaking of the user occurs during capturing, the prism 530 may be rotated at a predetermined angle with respect to the first and second hinge portions 552 and 554 by the first to third OIS driving units, thereby compensating for the hand shaking.

Figure 9:
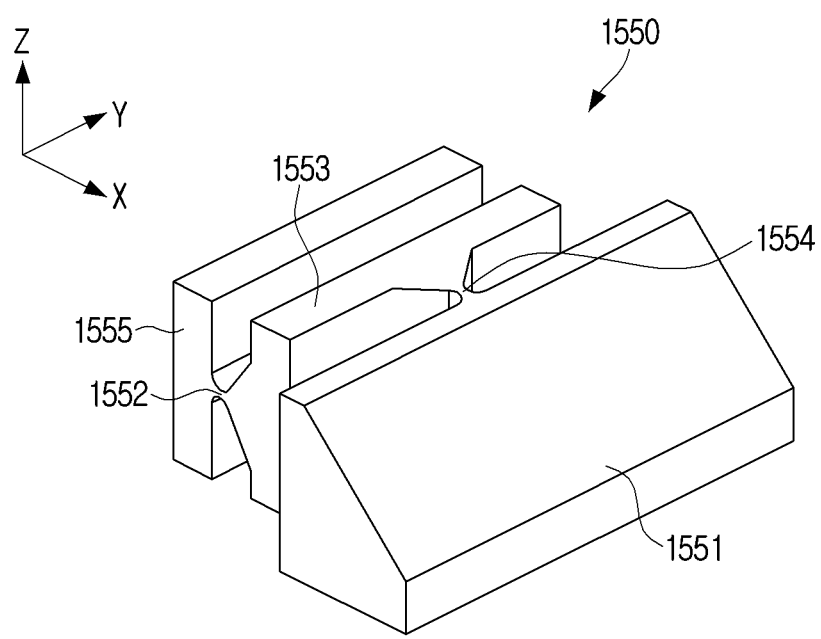
FIGS. 9 and 10 are perspective views illustrating various examples of a hinge member.
Figure 10:
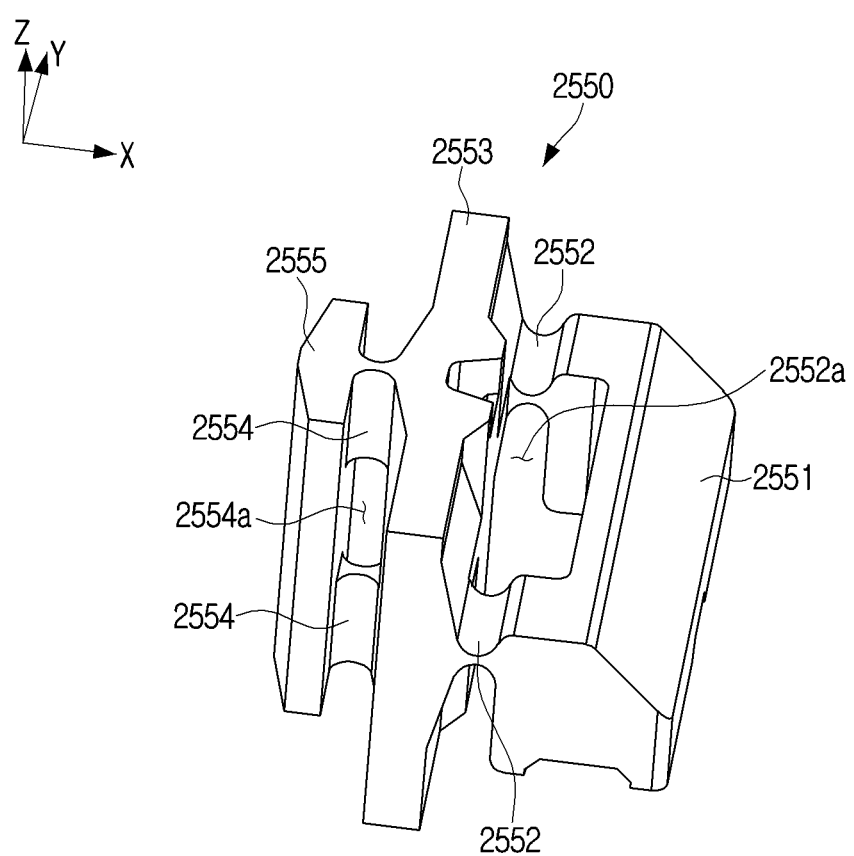

FIGS. 9 and 10 are perspective views illustrating various examples of a hinge member.

In the embodiment, the first hinge portion 552 disposed along the Y-axis direction is disposed closer to the prism 530 than the second hinge portion 554 formed along the Z-axis direction, but the embodiment is not limited thereto.

For example, as shown in FIG. 9, in the hinge member 1550, the second hinge portion 1554 formed along Z axis may be disposed to be closer to the prism 530 (or the fixing portion 1551) than the first hinge portion 1552 disposed along the Y-axis direction. In FIG. 9, undescribed reference numeral 1553 denotes a connection portion and 1555 denotes a coupling portion.

Referring to FIG. 10, a hinge member 2550 may remove a part of a first hinge portion 2552 and a second hinge portion 2554.

More specifically, a middle part out of the entire part of the first hinge portion 2552 is removed from the first hinge portion 2552, and the first hinge portion 2552 may be formed in a state in which a space 2552a is formed in the removed part. The second hinge portion 2554 may also be manufactured in a state in which the space 2554a is formed in the removed portion as the middle portion is removed from the entire body.

In this case, the first and second hinge portions 2552 and 2554 may be bent batter than the first and second hinge portions 552, 1552; 554, 1554 described above, thereby controlling the movement of the frame 530 with a small driving force. In addition, although a part of the first hinge portion 2552 may be removed, but it may be formed such that there is no removed part as the second hinge portion 554, 1554 described above. In contrast, although a portion of the second hinge portion 2554 is removed, the first hinge portion 2552 may have a shape that is not removed like the first hinge members 552 and 1552 described above.

The first and second hinge portions 2552, 2554 may adjust a degree of bending by increasing the thickness or material.

Referring to FIG. 10, undescribed reference numeral 2551 is a fixing portion, 2553 is a connection portion, and 2555 is a coupling portion.

Figure 11:
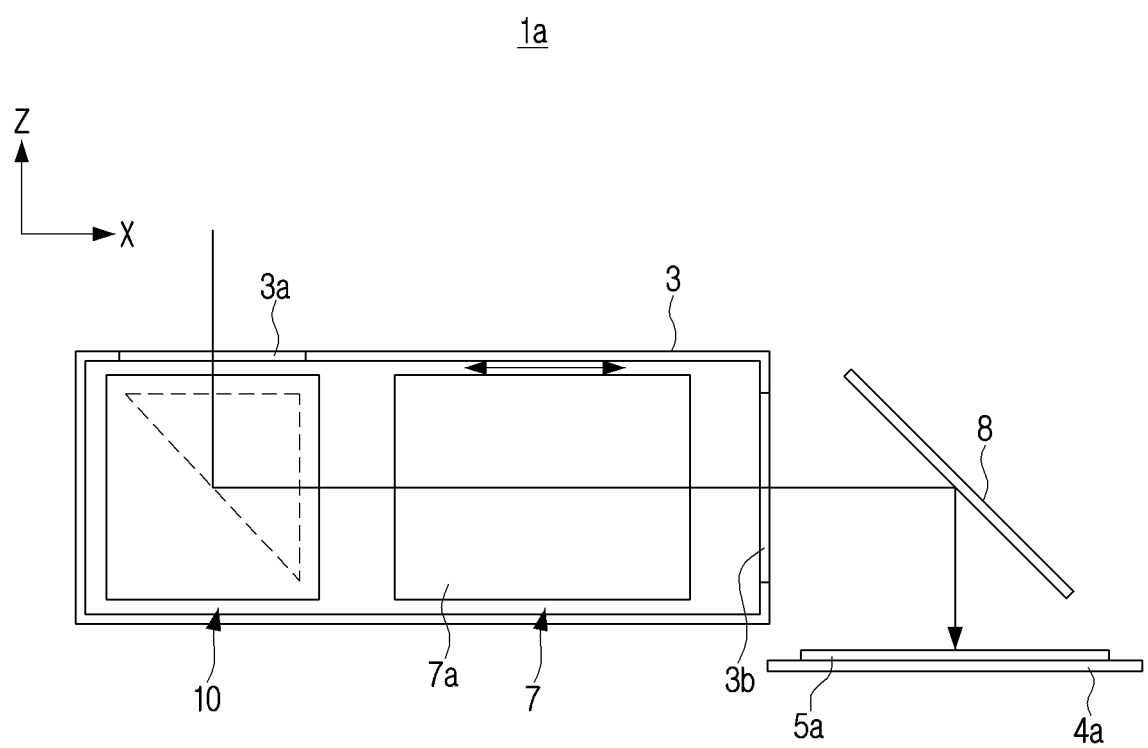
FIG. 11 is a schematic view illustrating a lens assembly according to another embodiment of the disclosure.

FIG. 11 is a schematic view illustrating a lens assembly according to another embodiment of the disclosure.

Referring to FIG. 11, in the lens assembly according to another embodiment, when the large area image sensor 5a is applied, the optical path transmitting through the lens unit 7 may be converted to the image sensor 5a by using the reflector 8.

The large area image sensor 5a may be disposed in approximately parallel with the length direction of the lens unit 7 and may not increase size or thickness of a small mobile device.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

INDUSTRIAL APPLICABILITY

The disclosure relates to an optical path changing unit for changing an optical path using a prism and a miniature lens assembly including the same.

What is claimed is:

1. An optical path changing unit comprising:
a base;
a prism unit in which a portion is connected to the base and another portion is movably disposed in the base; and
first to third optical image stabilizing (OIS) driving units configured to change the prism unit to a tiltable posture,
wherein the prism unit comprises:
a holder including a fixing groove formed on the rear surface of the holder;
a prism coupled to the holder; and
a hinge member for tiltably supporting the holder,
wherein the hinge member comprises:
a fixing portion coupled to the fixing groove of the holder by adhesive;
a connection portion disposed at a distance from the fixing portion;
a coupling portion fixed to the rear of the base and disposed at a distance from the connection portion;
a first hinge portion interconnecting the connection portion and the fixing portion; and
a second hinge portion disposed to be orthogonal to the first hinge portion and interconnecting the fixing portion and the coupling portion, and
wherein the fixing portion, the first hinge portion, the connection portion, the second hinge portion, and the coupling portion are integrally injection-molded to form the hinge member,
wherein the first hinge portion is configured to be divided into two parts by a first space formed at a central portion of the first hinge portion, and
wherein the second hinge portion is configured to be divided into two parts by a second space formed at a central portion of the second hinge portion.

2. The optical path changing unit of claim 1, wherein a material of the hinge member is a synthetic resin having elasticity.

3. The optical path changing unit of claim 1, wherein the first OIS driving unit tilts the prism about the first hinge portion, and
wherein the second and third OIS driving units tilt the prism about the second hinge portion.

4. The optical path changing unit of claim 3, wherein the first OIS driving unit comprises a first coil disposed on the lower surface of the base, and a first magnet coupled to the lower surface of the holder to respond to the direction of current applied to the first coil,
wherein the second OIS driving unit comprises a second coil disposed on a left side of the base, and a second magnet coupled to the left surface of the holder to respond to the direction of the current applied to the second coil, and
wherein the third OIS driving unit comprises a third coil disposed on the right side of the base, and a third magnet coupled to the right side of the holder to respond to the direction of the current applied to the third coil.

5. The optical path changing unit of claim 4, further comprising:
a flexible printed circuit board (FPCB) to which the first to third coils are electrically connected,
wherein the FPCB is coupled to the base while covering the lower, left and right sides of the base, and a plurality of terminals are arranged in a line at one end at intervals.

6. A lens assembly comprising:
the optical path changing unit of claim 1;
a case in which the optical path changing unit is disposed at a first side in the case;
an image sensor disposed at a second side of the case; and
a lens unit disposed on an optical path between the optical path changing unit and the image sensor.

* * * * *